May 14, 1940.  S. RUBEN  2,200,301
POTENTIAL-PRODUCING CELL
Filed Jan. 22, 1937
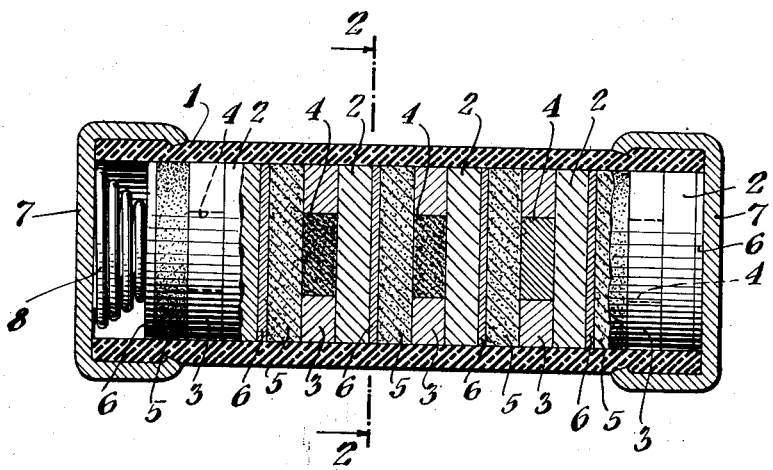
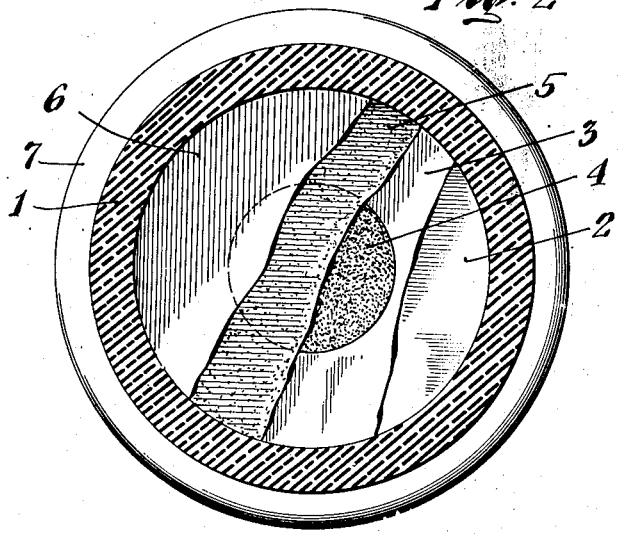
INVENTOR
Samuel Ruben
BY
ATTORNEY Patented May 14, 1940

2,200,301

UNITED STATES PATENT OFFICE 2,200,301

POTENTIAL-PRODUCING CELL

Samuel Ruben, New Rochelle, N. Y.

Application January 22, 1937, Serial No. 121,753

6 Claims. (Cl. 136—100)

This invention relates to a device for producing a constant potential and this application is a continuation in part of my pending application Serial Number 633,607, filed September 17, 1932.

An object of the invention is the provision of a device suitable for biasing the grid control elements of electrical discharge devices.

A further object is the provision of such a device which when properly used will show negligible change over a long period of time.

Other objects will be apparent from the disclosure.

Fundamentally the invention comprises the use of dissimilar electrode materials between which there is a relatively large contact potential difference, in combination with a contacting medium which only in a limited way serves as an electrolyte, in the usual sense of the term. In the present cell the electrolyte is one which will not substantially chemically react with either of the electrodes. Preferably it comprises gum possessing weak electrolytic properties resulting from its normal constituents gum such as gum arabic or gum tragacanth dissolved or reacted with a polyhydroxy alcohol such as ethylene glycol or glycerine. Instead of the glycol or glycerine I may use a conductive ester of one of these materials such as glycol or glycerol acetate, citrate, etc. For some uses where high insulation resistance obtains, the gum itself may constitute an adequate electrolyte.

To obtain the maximum potential the negative electrode is chosen from the group of electro-positive elements such as, for example, aluminum, zinc, cadmium, the latter being the preferred element. For the positive electrode the most electro-negative materials are preferred, for instance, those chosen from electronically conducted compounds such as ferrous-ferric oxide, cuprous or cupric sulphide or vanadium pentoxide, the latter being the preferred compound.

With electrodes formed of these materials the voltage generated by the cell is about one volt.

As the biasing of the grid control elements is basically an electrostatic function, there are no static current flow requirements. The cell of this invention is, therefore, peculiarly fitted for such use since it will not maintain a current flow due to the fact that the negative electrode is not soluble in the electrolyte as are the electrodes in the customary dry battery cells.

A suitable electrolyte may be made as follows: Thirty grams of gum arabic are dissolved in sixty-five grams of glycerine heated to 120° C., the temperature being maintained for a period of about twenty minutes after the gum arabic has been completely dissolved and thereafter five grams of glycerol acetate are added.

Absorbent discs of gauze or paper are dipped into the hot solution and thereafter assembled with the electrodes. The electrolyte solution when cool is an adhesive and slightly conductive mass which will not dry out.

A typical cell is shown in the accompanying drawing illustrating an embodiment of the invention, Fig. 1 showing a device partially cut away and Fig. 2 showing a sectional view on line 2—2.

In the drawing, a tube 1 constructed of fiber or other suitable material houses a series of voltaic cells each composed of negative electrode cadmium discs 2, vanadium pentoxide positive discs 5 and gum arabic-glycerol impregnated cotton plugs 4 which afford the necessary electrical contact between electrodes 2 and 5. The plugs 4 are disposed within sealing washers 3 which are of rubber, paraffined paper, or other material adapted to prevent leakage of the electrolyte or absorption of moisture from the atmosphere. Lead washers 6 space and contact the couples which are maintained under constant pressure by a spring 8 and metal caps 7 which close the device.

What is claimed is:

1. A potential-supplying battery comprising a negative electrode composed of an electropositive element, a positive electrode formed of a material electronegative thereto, and an electrolyte in contact with both said electrodes, the essential active electrolytic potential producing ingredient of which is a gum of the gum arabic-gum tragacanth class possessing weak electrolytic properties resulting from its normal constituents, said electrodes being substantially insoluble in and substantially unreactive with said electrolyte, whereby said battery suffers negligible deterioration when in use for an electrostatic potential supply or when not in use and is incapable of producing any appreciable current flow when in a closed circuit but is characterized by the ability to produce a potential difference in the absence of current flow.

2. A potential-supplying battery comprising a negative electrode composed of an electropositive element, a positive electrode formed of a material electronegative thereto, and an electrolyte in contact with both said electrodes, the electrolyte being composed of a non-drying agent and a gum of the gum arabic-gum tragacanth class possessing weak electrolytic properties resulting from its normal constituents, said electrodes being substantially insoluble in and substantially unreactive with said electrolyte, whereby said battery suffers negligible deterioration when in use for an electrostatic potential supply or when not in use and is incapable of producing any appreciable current flow when in a closed circuit but is characterized by the ability to produce a potential difference in the absence of current flow.

3. A potential-supplying battery comprising a negative electrode composed of an electropositive element, a positive electrode formed of a material electronegative thereto, and an electrolyte in contact with both said electrodes, the electrolyte being composed of a non-drying agent selected from the group consisting of the polyhydric alcohols and their weak acid esters and a gum of the gum arabic-gum tragacanth class possessing weak electrolytic properties resulting from its normal constituents, said electrodes being substantially insoluble in and substantially unreactive with said electrolyte, whereby said battery suffers negligible deterioration when in use for an electrostatic potential supply or when not in use and is incapable of producing any appreciable current flow when in a closed circuit but is characterized by the ability to produce a potential difference in the absence of current flow.

4. A potential-supplying battery comprising a negative electrode composed of an element chosen from the group consisting of aluminum, zinc and cadmium, a positive electrode of an electronically conductive material electronegative with respect to said negative electrode and a contacting electrolyte consisting substantially of gum arabic.

5. A potential-supplying battery comprising a negative electrode composed of an element chosen from the group consisting of aluminum, zinc and cadmium, a positive electrode of an electronically conductive material electronegative with respect to said negative electrode and a contacting electrolyte consisting substantially of gum tragacanth.

6. A potential-supplying battery comprising a negative electrode of cadmium, a positive electrode of vanadium pentoxide and a contacting electrolyte consisting substantially of gum arabic.

SAMUEL RUBEN.